United States Patent

Degi et al.

Patent Number: 5,185,817
Date of Patent: Feb. 9, 1993

[54] IMAGE PROCESSOR

[75] Inventors: Greg A. Degi, Fort Collins; Dean C. Buck, Loveland, both of Colo.

[73] Assignee: Hewlett-Packard Company, Palo Alto, Calif.

[21] Appl. No.: 700,007

[22] Filed: May 14, 1991

[51] Int. Cl.[5] .............................................. G06K 9/42
[52] U.S. Cl. .................................... 382/47; 340/731; 364/723
[58] Field of Search ................. 382/47, 44, 46, 56, 382/27; 740/731, 727; 358/133; 364/715.07, 723

[56] References Cited

U.S. PATENT DOCUMENTS

| 4,381,547 | 4/1983 | Bjiri | 382/47 |
| 4,447,882 | 5/1984 | Walz | 382/47 |
| 4,528,693 | 7/1985 | Penson et al. | 382/56 |
| 4,569,081 | 2/1986 | Mintzer et al. | 382/47 |
| 4,631,751 | 12/1986 | Anderson et al. | 382/47 |
| 4,656,664 | 4/1987 | Anderson et al. | 382/47 |
| 4,712,140 | 12/1987 | Mintzer et al. | 382/47 |
| 4,774,581 | 9/1988 | Shibatsu et al. | 382/47 |
| 4,907,284 | 7/1990 | Ohuchi | 382/47 |
| 5,054,100 | 10/1991 | Tai | 382/47 |

Primary Examiner—Joseph Mancuso

[57] ABSTRACT

An image processor for converting an input matrix of input pixels into an output matrix of output pixels, where the number of input pixels differs from the number of output pixels. From the input matrix, the image processor generates an intermediate resolution matrix. The number of pixels in a particular dimension of the intermediate resolution matrix is an integer multiple of the desired number of output pixels in the same dimension. This enables the image processor to select from the intermediate resolution matrix output pixels which are evenly space from one another in the same dimension.

19 Claims, 8 Drawing Sheets

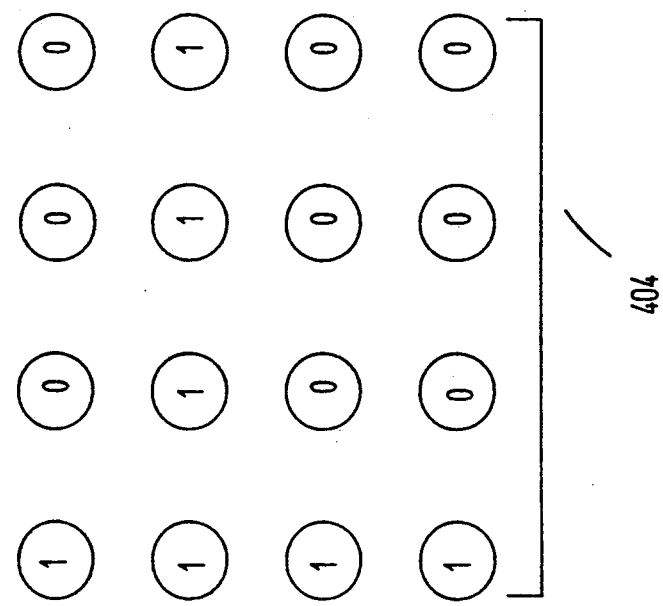
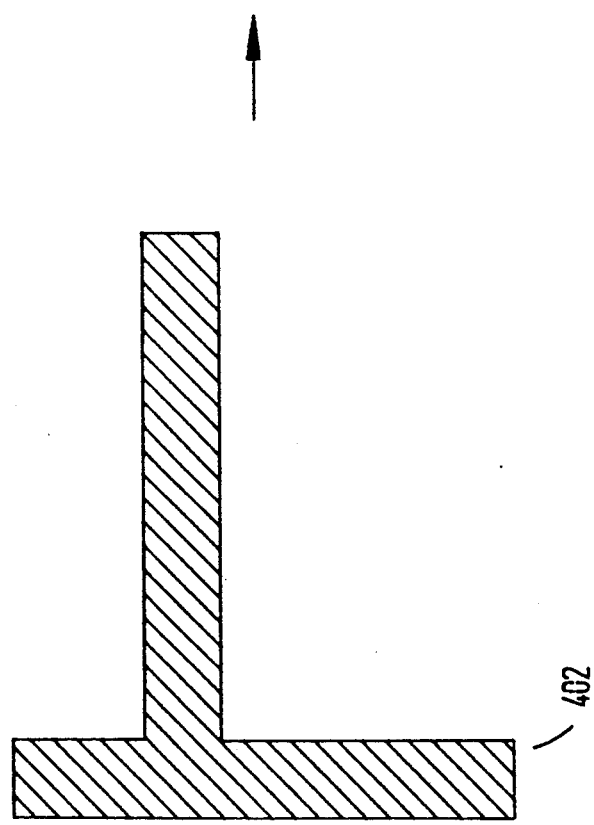
FIG 4

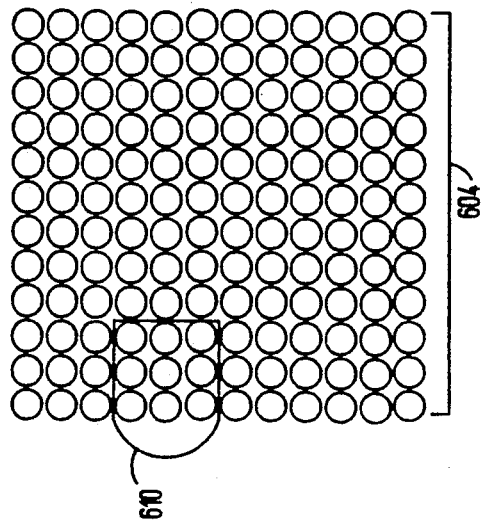
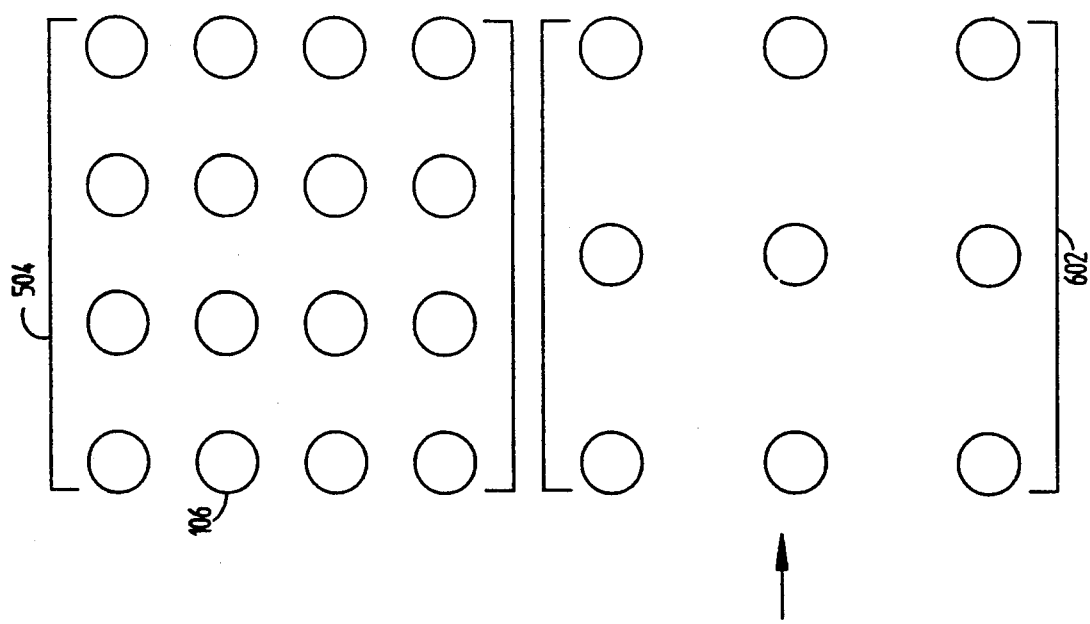
FIG 6 (PRIOR ART)

IMAGE PROCESSOR

BACKGROUND OF THE INVENTION

1. Field Of The Invention

The present invention relates generally to an apparatus and method for image processing. More particularly, the present invention relates to an image processing apparatus and method for converting an input matrix of input picture elements into an output matrix of output picture elements, where the number of input picture elements is greater than the number of output picture elements.

2. Related Art

A scanning device is an input device for a computer. The scanning device generates an n-dimensional digital representation from an n-dimensional image. Ordinarily, n is two. The digital representation comprises an n-dimensional matrix of picture elements (pixels). The value of each pixel indicates the amount of light reflected from the portion of the image that the pixel represents.

Resolution means the number of pixels used to represent an image. Accordingly, the resolution of a matrix is the number of pixels in the matrix.

FIG. 4 shows an example of a matrix for a 2-dimensional image. The input image 402 is of two perpendicular bars. From the input image 402, the scanning device would generate an input matrix 404. In the example, the pixels are binary. Zeros represent much light reflected and ones represent little or no light reflected.

The resolution of the input matrix 404 often exceeds the resolution of the printers, CRT's and other devices which will process it. Such devices require that an image processor first reduce the resolution. An image processor generates an output matrix which is a digital representation of the input image but which has a lower resolution (fewer pixels).

A first conventional image processor operates by performing a process called binary rate multiplication on each input row of the input matrix to generate the lower resolution output rows of the output matrix. Note that it could instead, or additionally, reduce the resolution in the vertical direction by reducing the number of rows in a similar manner.

Binary rate multiplication is a process of partitioning a set of elements into a number of mutually exclusive subsets, each having a different number of elements. The lower resolution output row consists of the unique combination of subsets in which the total number of pixels equals the desired resolution. (The desired resolution is the number of pixels in the first conventional output row 512.)

Specifically, the first subset consists of every second element of the set, the second subset consists of every fourth element of the set and, in general, the $i^{th}$ subset consists of every $2^{(-i)th}$ element of the set. The first element of a subset is the first element of the set which is in no larger subset.

FIG. 1 shows a set 102 of elements and the subsets that it would be partitioned into by binary rate multiplication. The set 102 consists of eight elements. A first subset 104 consists of the first, third, fifth and seven elements of the set 102. A second subset 106 consists of the second and sixth elements of the set 102. A third subset 108 consists of the fourth element of the set 102.

A fourth subset 110 consists of the eighth element of the set 102.

In the first conventional image processor, the set of elements is an input row. An output row includes a subset if the number of pixels in the subset plus the sum of the number of pixels in all larger subsets does not exceed the desired output resolution.

FIG. 5 shows a four row, four column input matrix 504 and a four row, three column output matrix 502 of a first conventional image processor.

The image represented by the input matrix 504 is similar to the input image 402, except that the darkness of the horizontal bar decreases from left to right. The value of each pixel is inversely proportional to the amount of light reflected by the portion of the image which it represents.

The first conventional image processor generates a first conventional output row 512 of the first conventional output matrix 502 from an input row 510 of the input matrix 504 by performing binary rate multiplication to partition the input row 510 into mutually exclusive subsets. The first subset consists of the first and third pixels 106 and 108, respectively, of the input row 510. Because the number of pixels in the subset (two) plus the sum of the number of pixels in all larger subsets (zero) does not exceed the desired output resolution (three), the first subset is included in the first conventional output row 512.

The second subset consists of the second pixel 114 of the input row 510. The number of pixels in the subset (one) plus the sum of the number of pixels in all larger subsets (two) equals the desired output resolution (three). Therefore, the first conventional output row 512 consists of the first and second subset.

A disadvantage of the first conventional image processor is that when binary rate multiplication is used to eliminate more than a small percent of pixels in the input matrix, the output matrix will substantially distort the input image.

A second conventional image processor uses pixel replication and two-dimensional convolution to generate an intermediate matrix having a resolution which is an integer multiple of the resolution of both the input matrix and the output matrix. It then generates the output matrix by selecting from the intermediate matrix a subset of pixels which are evenly spaced from one another. The number of pixels between each pixel of the subset is one less than the ratio of the resolution of the intermediate matrix to the resolution of the output matrix.

The text Digital Image Processing, by Rafael C. Gonzales and Paul Wintz (Addison-Wesely Publishing Co., pages 136–154 (1977)) discusses two-dimensional convolution in detail and is hereby incorporated by reference.

FIG. 6 shows example of how the second conventional image processor generates a three row, three column output matrix 602 from the four row, four column input matrix 504 of FIG. 5. First, the second conventional image processor performs pixel replication on the input matrix 504 to generate a twelve row, twelve column intermediate matrix 604. In the example, pixel replication involves replacing each input pixel (such as the first input pixel 106) with a three row, three column sub-matrix (such as the sub-matrix 610). Each pixel in the sub-matrix 610 has the value of the input pixel 106. Second, the second image processor performs two-dimensional convolution to modify pixel values in the intermediate matrix 604 so as to smooth the borders between the sub-matrices. Finally, the second conventional image processor generates the output matrix 602 by selecting the subset of the intermediate matrix 604 consisting of every fourth pixel in each row and every fourth pixel in each column of the intermediate matrix 604. In other words the subset consists of the pixels separated from one another by three pixels.

The second conventional image processor produces more accurate output matrices than the first conventional image processor. However, two-dimensional convolution requires excessive computation time. Therefore, the second image processor would be impractical for many applications.

Therefore, there is a need for an accurate, high performance image processor.

SUMMARY OF THE INVENTION

The present invention is directed toward an image processor for converting an input matrix of input pixels into an output matrix of output pixels, where the number of input pixels differs from the number of output pixels. From the input matrix, the image processor generates an intermediate resolution matrix. The number of pixels in a particular dimension of the intermediate resolution matrix is an integer multiple of the desired number of output pixels in the same dimension. This enables the image processor to select output pixels from the intermediate resolution matrix which are evenly spaced from one another in the same dimension.

Performing a substantial amount of the conversion by selecting pixels which are evenly spaced from one another enables the image processor to work with minimal distortion and with minimal computation time.

BRIEF DESCRIPTION OF THE DRAWINGS

The present invention will be more fully understood with reference to the accompanying drawings in which:

FIG. 4 shows an input image and an input matrix representative of the input image;

FIG. 6 shows the input matrix of FIG. 2 as well as an intermediate matrix and a second conventional output matrix as generated by the second conventional image processor;

DETAILED DESCRIPTION OF THE PREFERRED EMBODIMENT

The present invention is directed toward an accurate, high-performance image processor for converting an input matrix of input pixels into an output matrix of output pixels, where the number of input pixels is greater than the number of output pixels.

In the preferred embodiment, the improved image processor 800 reduces resolution in the horizontal dimension by reducing the number of columns in an input matrix. Note that it could instead, or additionally, reduce the resolution in the vertical direction by reducing the number of rows in a similar manner.

Figure 8:
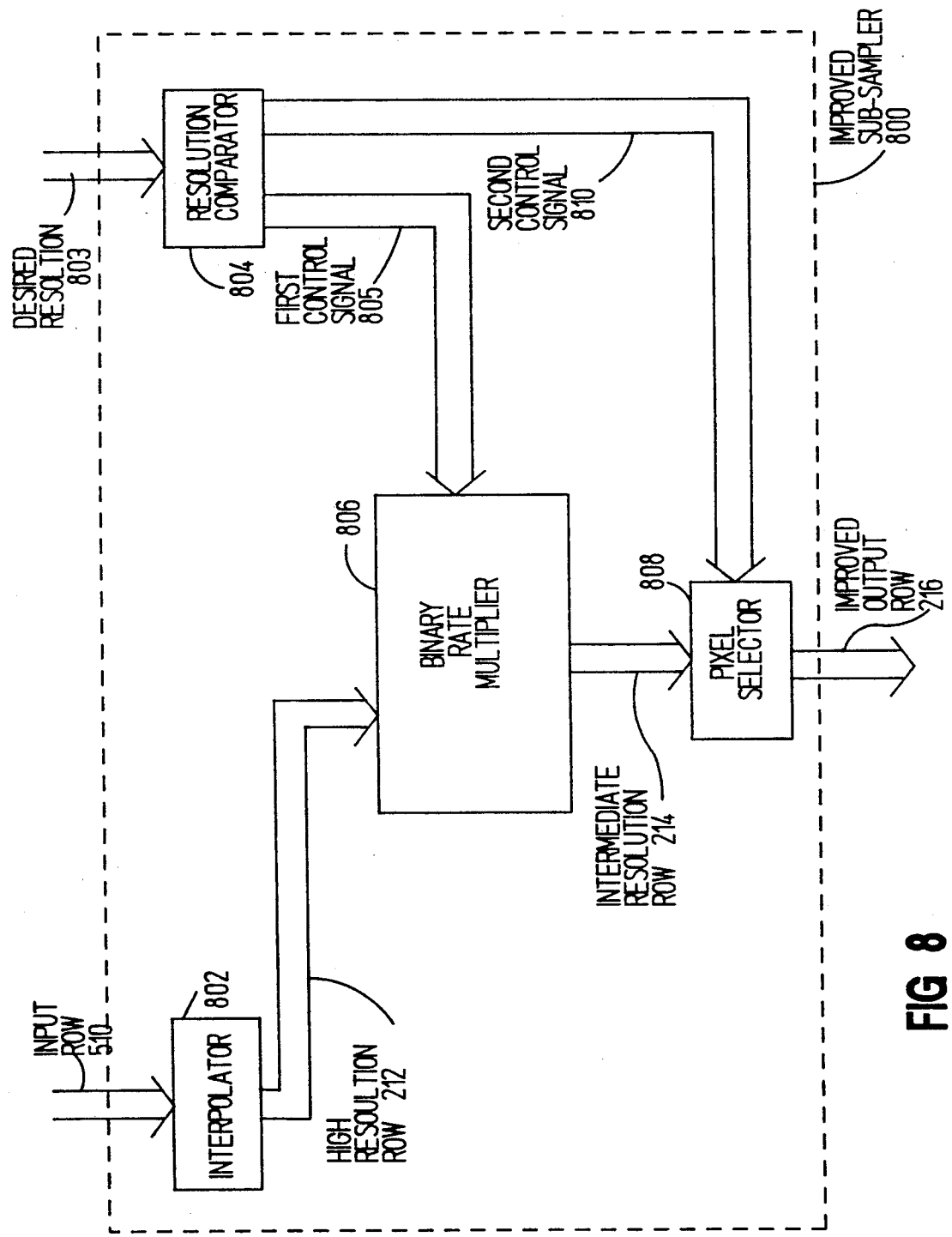
FIG. 8 shows a functional block diagram of the improved image processor of the present invention.

FIG. 8 shows the major functional blocks of the apparatus of the improved image processor 800. The inputs to the improved image processor 800 are an input row 510 of an input matrix 504 (first matrix) and a desired resolution 803. The output is an improved output row 216 of an improved output matrix 202 (second matrix). The improved image processor 800 comprises a Resolution Comparator (fourth means) 804, an Interpolator (third means) 802, a Binary Rate Multiplier (first means) 806 and an Alternate Pixel Selector (second means) 808.

The improved image processor 800 can be implemented with commercially available electronic components. It could be constructed with standard integrated circuits (IC), for example, TTL chips or an ASIC. The specific circuitry of each functional block would be obvious to one of skill in the art.

Figure 2:
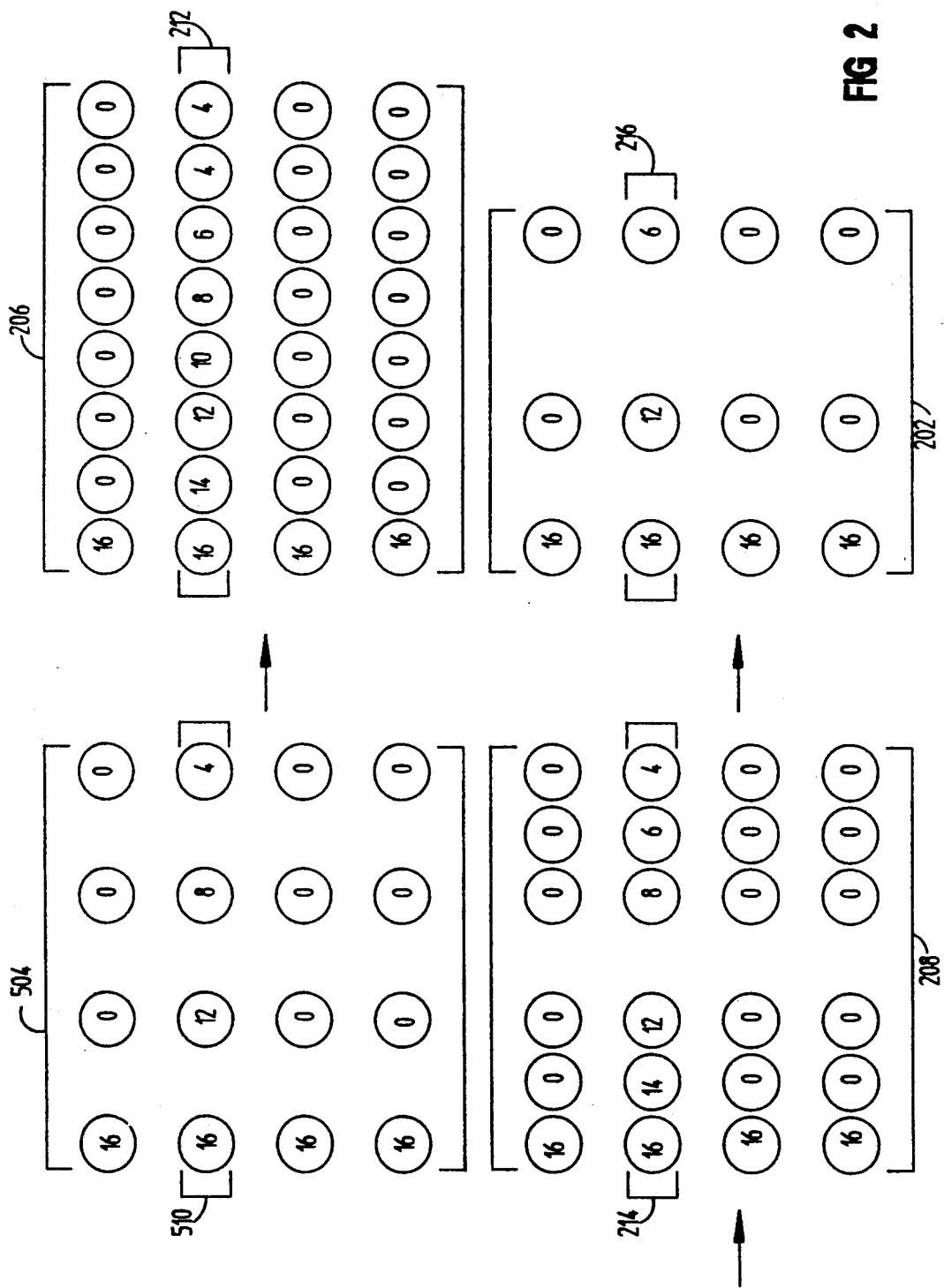
FIG. 2 shows an input matrix as well as a high resolution matrix, an intermediate resolution matrix and an improved output matrix as generated by the improved image processor of FIG. 8.
Figure 5:
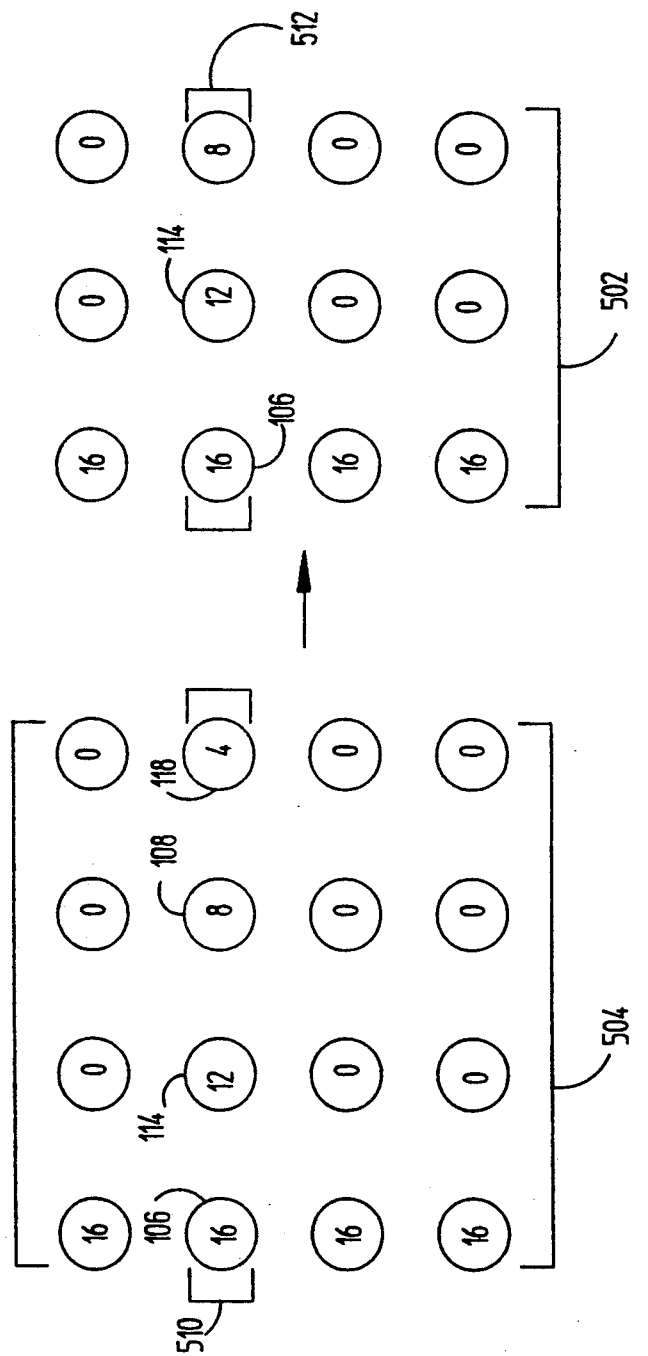
FIG. 5 shows the input matrix of FIG. 2 as well as a first conventional output matrix as generated by the first conventional image processor.

FIG. 2 shows an example of an input matrix 504, and intermediate matrices and an output matrix 202 as generated by the improved image processor 800. The input matrix 504 is the four row, four column matrix of FIG. 5. The intermediate matrices comprise a four row, eight column high resolution matrix 206 (fourth matrix) and a four row, six column intermediate resolution matrix 208 (third matrix). The output matrix is a four row, three column improved output matrix 202.

Figure 3:
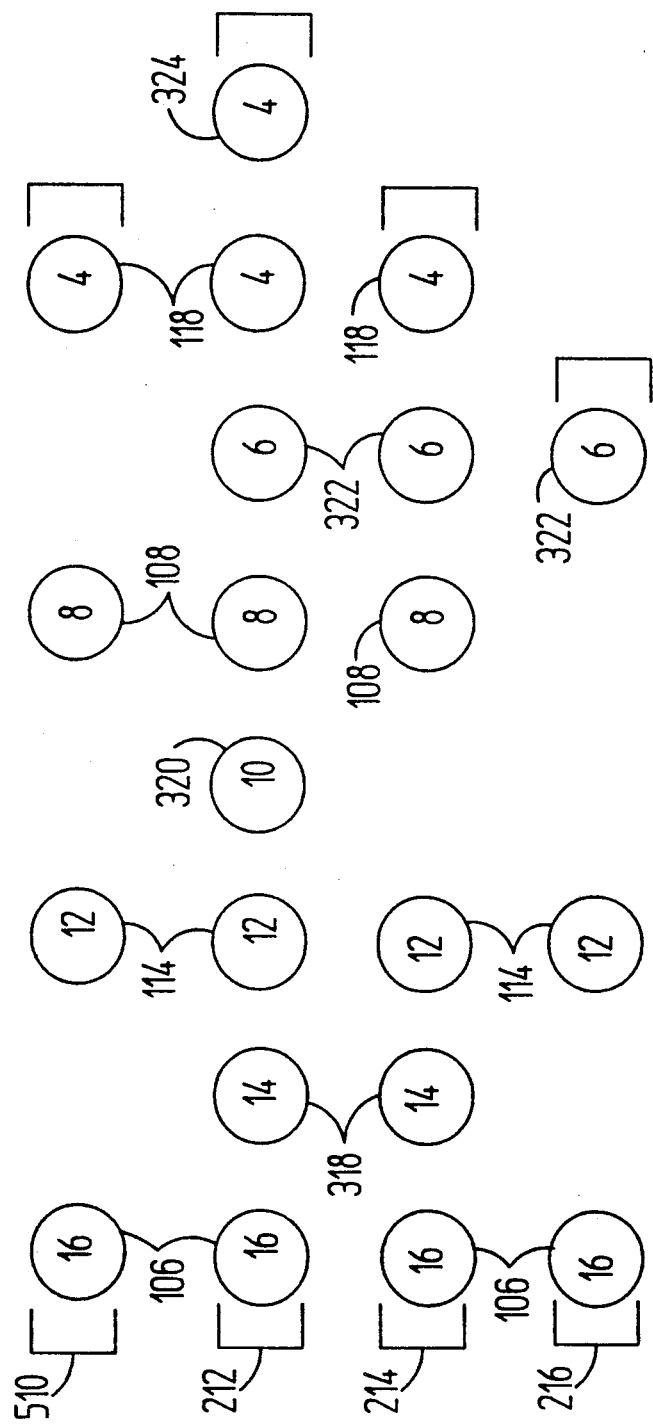
FIG. 3 shows an input row of the input matrix of FIG. 2 as well a high resolution row of the high resolution matrix of FIG. 2, an intermediate resolution row of the intermediate resolution matrix of FIG. 2, and an improved output row of the improved output matrix of FIG. 2 as generated by the improved image processor of FIG. 8.

FIG. 3 shows a four pixel input row 510 of the input matrix 504, an eight pixel high resolution row 212 of the high resolution matrix 206, a six pixel intermediate resolution row 214 of the intermediate matrix 208, an improved output row 216 of the improved output matrix 202.

The improved image processor 800 operates essentially as follows. The Resolution Comparator 804 determines the ratio of the desired resolution 803 to the input resolution. The ratio enables it to calculate a first control signal 805 for the Binary Rate Multiplier 806 and a second control signal 810 for the Pixel Selector 808. The Interpolator 802 performs interpolation on the input row 510 to generate the high resolution row 212. The high resolution row 212 has twice the resolution of the input row 510. The Binary Rate Multiplier 806 then performs binary rate multiplication on the high resolution row 212 to generate the lower resolution intermediate resolution row 214. The first control signal 805 represents the ratio of the high resolution row 212 to the intermediate resolution row 214. Finally, the Pixel Selector 808 generates the improved output row 216 by selecting pixels from the intermediate resolution row 214 which are evenly spaced from one another. The second control signal 810 indicates the number of pixels between each selected pixel of the intermediate resolution row 214.

The purpose of the Resolution Comparator 804 is to generate a first control signal 805 for controlling the Binary Rate Multiplier 806 and a second control signal 810 for controlling the Pixel Selector 808. Input to the Resolution Comparator 804 is the desired resolution 803 (the number of pixels desired in the output). In the preferred embodiment, the input resolution is a constant which is available to the Resolution Comparator. In an embodiment where the input resolution varies, the input row 510 could be an input to the Resolution Comparator 804.

The first control signal 805 is a binary fraction which represents the approximate ratio of the output line of the Binary Rate Multiplier 806 to the input line to that component. The output of the Binary Rate Multiplier 806 is the intermediate resolution row 214. The input is the high resolution row 212. The resolution of the high resolution row 212 is twice the resolution of the input row 510. The resolution of the intermediate resolution row 214 is generally twice the desired resolution 803.

However, this general rule does not apply to the special case where the improved image processor 800 is not reducing resolution. The device is capable of increasing resolution by up to a factor of two. In this case, the resolution of the intermediate resolution row 214 is the desired resolution 803.

Accordingly, the first control signal 805 is set to the ratio of the desired resolution 803 to twice the input resolution. If this ratio less than one-half (indicating that the desired resolution 803 is less than the input resolution), the first control signal 805 is doubled.

The second control signal 810 indicates the number of pixels between each selected pixel of the intermediate resolution row 214. The input line to the Pixel Selector 808 is the intermediate resolution row 214. The output line is the improved output row 216. The resolution of the improved output row 216 is the output resolution 803. As stated, if the ratio of the desired resolution 803 to twice the input resolution is less than one-half, then the desired resolution 803 is less than the input resolution and the resolution of the intermediate resolution row 214 is twice the desired resolution 803. In this case, the second control signal 810 is one, indicating that one pixel will be between each selected pixel of the intermediate resolution row 214. The Pixel Selector 808 would thus select every other pixel from the intermediate resolution row 214.

Otherwise, the resolution of the intermediate resolution row 214 is the desired resolution 803. Accordingly, the second control signal 810 would be zero, indicating that no pixels will be between each selected pixel of the intermediate resolution row 214. The Pixel Selector 808 would thus select every pixel from the intermediate resolution row 214.

In the example of FIG. 3, the desired resolution 803 is three and the input resolution is four. Thus, the ratio of the desired resolution 803 to twice the input resolution is three-eighths. Because three-eighths is less than one-half, the ratio is doubled. The Resolution Comparator 804 therefore sets the first control signal 805 to six-eighths (three-fourths). Because the ratio of the desired resolution 803 to twice the input resolution is less than one-half, the Resolution Comparator 804 sets the second control signal 810 to one.

Note that the improved image processor 800 could be designed so that interpolation would not be performed if the input resolution were at least twice as great as the desired resolution 803. If the input row 510 was not interpolated, the first control signal 803 would be the ratio of the desired resolution 803 to the input resolution. The second control signal 810 would be set to one.

Note that the improved image processor 800 could also be designed to generate the intermediate resolution matrix 214 with a resolution of more than twice the desired resolution 803 if the input resolution were much greater than the desired resolution 803. More particularly, the Binary Rate Multiplier 806 could generate the intermediate resolution row 214 with a resolution equal to the greatest integer multiple of the desired resolution 803 which is not greater than the input to the Binary Rate Multiplier 806. If interpolation was performed, the input would be the high resolution row 212. Otherwise, the input would be the input row 510.

In such an embodiment, the first control signal 805 would be the ratio of the above greatest integer multiple to twice the resolution of the input to the Binary Rate Multiplier 806. The second control signal 810 would be on less than the ratio of the above greatest integer multiple to the desired resolution 803.

Implementation of the Resolution Comparator 804 would be obvious to one of skill in the art. For example, a divider could be used to determine the required ratio. Whether or not the ratio exceeded one-half could be determined by the value of the most significant bit of the ratio. A shift register could be used to double the input resolution and to double the ratio. In the preferred embodiment, the second control signal 810 would be the most significant bit of the ratio. A divider and a comparator could be used to determine the greatest integer multiple of the desired resolution not greater than the resolution of the input to the Binary Rate Multiplier 806.

The purpose of the Interpolator 802 is to effectively double the resolution of the input row 510 The detailed operation of the Interpolator 802 is as follows. The Interpolator 802 generates a high resolution row 212 comprising the input pixels of the input row 510 plus an interpolated pixel between each pair of consecutive input pixels and after the last input pixel. The value of each interpolated pixel is generally the average of the value of the input pixel preceding it and value of the input pixel succeeding it. However, the value of the last interpolated pixel is the value of the last input pixel.

In the example of FIG. 3, the high resolution row 212 consists of the first input pixel 106, the first interpolated pixel 318, the second input pixel 114, the second interpolated pixel 320, the third input pixel 108, the third interpolated pixel 322, the fourth input pixel 118 and the fourth interpolated pixel 324. The value of the first interpolated pixel 318 (fourteen) is the average of the values of the first input pixel 106 (sixteen) and the second input pixel 114 (twelve). The value of the second interpolated pixel 320 (ten) is the average of the values of the second input pixel 114 (twelve) and the third input pixel 108 (eight). The value of the third interpolated pixel 322 (six) is the average of the values of the third input pixel 108 (eight) and the fourth input pixel 118 (four). The value of the fourth interpolated pixel 324 (four) is the value of the fourth input pixel 118 (four).

Implementation of the Interpolator 802 would be obvious to one of skill in the art. For example, an adder could be used to sum two pixels. A shift register could be used to divide the sum by two. A delay device could be used to delay the output of the second input pixel until after the output of the interpolated pixel.

The purpose of the Binary Rate Multiplier 806 is to reduce the resolution of the high resolution row 212 to an integer factor of the desired resolution 803. The detailed operation of the Binary Rate Multiplier 806 is as follows. The Binary Rate Multiplier 80 employs binary rate multiplication to partition the high resolution row 212 into mutually exclusive subsets. As with the first conventional image processor, no two subsets have the same number of elements. The intermediate resolution row 214 consists of the unique combination of subsets in which the total number of pixels equals the desired resolution 803.

Specifically, the intermediate resolution row 214 consists of the subsets specified by the first control signal 805. As stated, the first control signal 805 is the binary fraction which represents the approximate ratio of the resolution of the intermediate resolution row 214 to the resolution of the high resolution row 212. If the first bit of the first control signal 805 is one, the intermediate resolution row 214 includes a first subset of the high resolution row 212. Similarly, if the second bit of the first control signal 805 is one, the intermediate resolution row 214 includes a second subset. In general, if the $i^{th}$ bit of the first control signal 805 is one, the intermediate resolution row 214 includes an $i^{th}$ subset. As explained above, the $i^{th}$ subset consists of every $2^{(-i)th}$ element of the high resolution row 212.

In the example of FIG. 3, the resolution of the high resolution row 212 is eight, and the first control signal 805 is the binary fraction which represents three-fourths. Only the first and second bit of the fraction would be one. The first subset contains the first, second, third and fourth input pixels 106, 114, 108 and 118, respectively. The second subset contains the first and third interpolated pixels 318 and 322, respectively. Therefore, the intermediate resolution row 214 consists of the first input pixel 106, the first intermediate pixel 318, the second input pixel 114, the third input pixel 108, the third interpolated pixel 322 and the fourth input pixel 118.

Implementation of the Binary Rate Multiplier 806 would be obvious to one of skill in the art. For example, it could be implemented with a Texas Instruments SN 7497 Synchronous Six Bit Binary Rate Multiplier.

The purpose of the Alternate Pixel Selector 808 is to generate the improved output row 216 having a resolution equal to the desired resolution 803 from a matrix having a resolution which is an integer multiple of the desired resolution 803. The detailed operation of the Alternate Pixel Selector 808 is as follows. It generates the improved output row 216 by selecting pixels from the intermediate resolution row 214 which are evenly spaced from one another. The second control signal 810 indicates the number of pixels between each selected pixel of the intermediate resolution row 214.

In the example of FIG. 3, the second control signal 810 is one. Accordingly, the Pixel Selector 808 selects every other pixel from the intermediate resolution row 214 to generate the improved output row 216. The improved output row 216 therefore consists of the first input pixel 106, the second input pixel 114 and the third interpolated pixel 322.

Implementation of the Pixel Selector 808 would be obvious to one of skill in the art. For example, it could be implemented with a flip-flop and an AND gate. Alternatively, it could be implemented with a Texas Instruments SN 7497 Synchronous Six Bit Binary Rate Multiplier.

Figure 1:
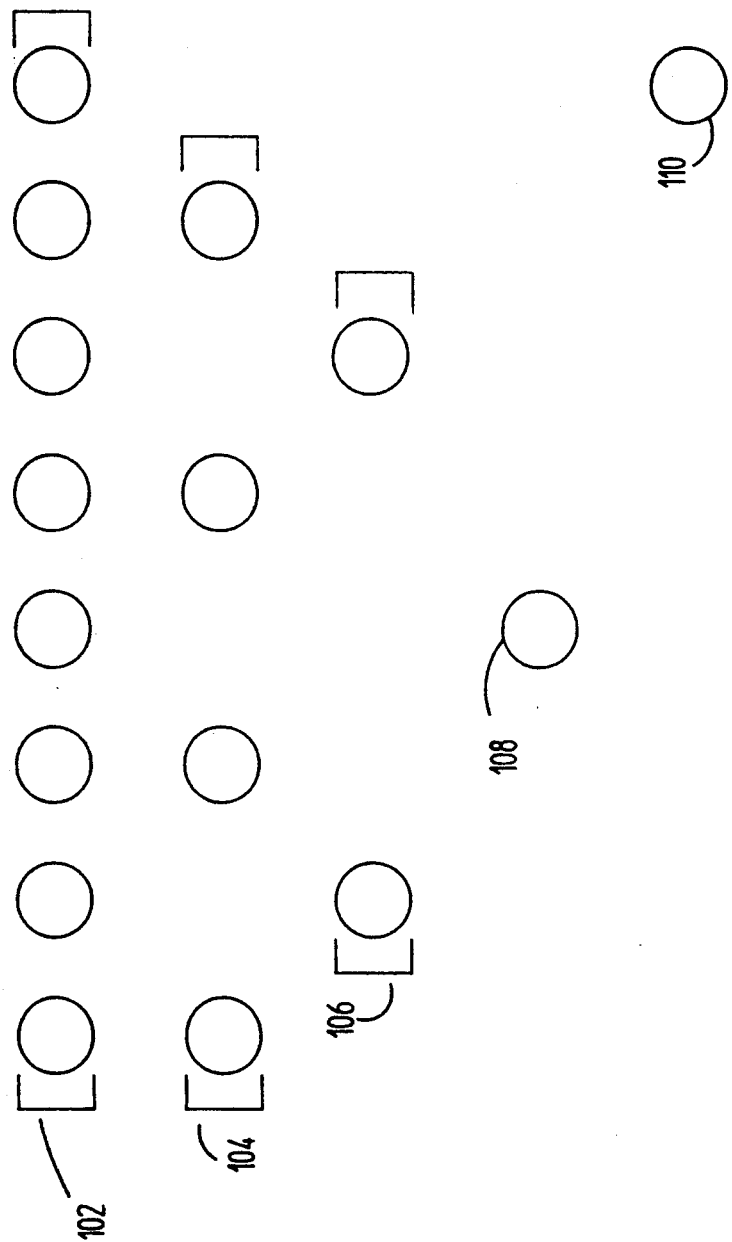
FIG. 1 shows a set of elements and the subsets that it would be partitioned into by binary rate multiplication.
Figure 7:
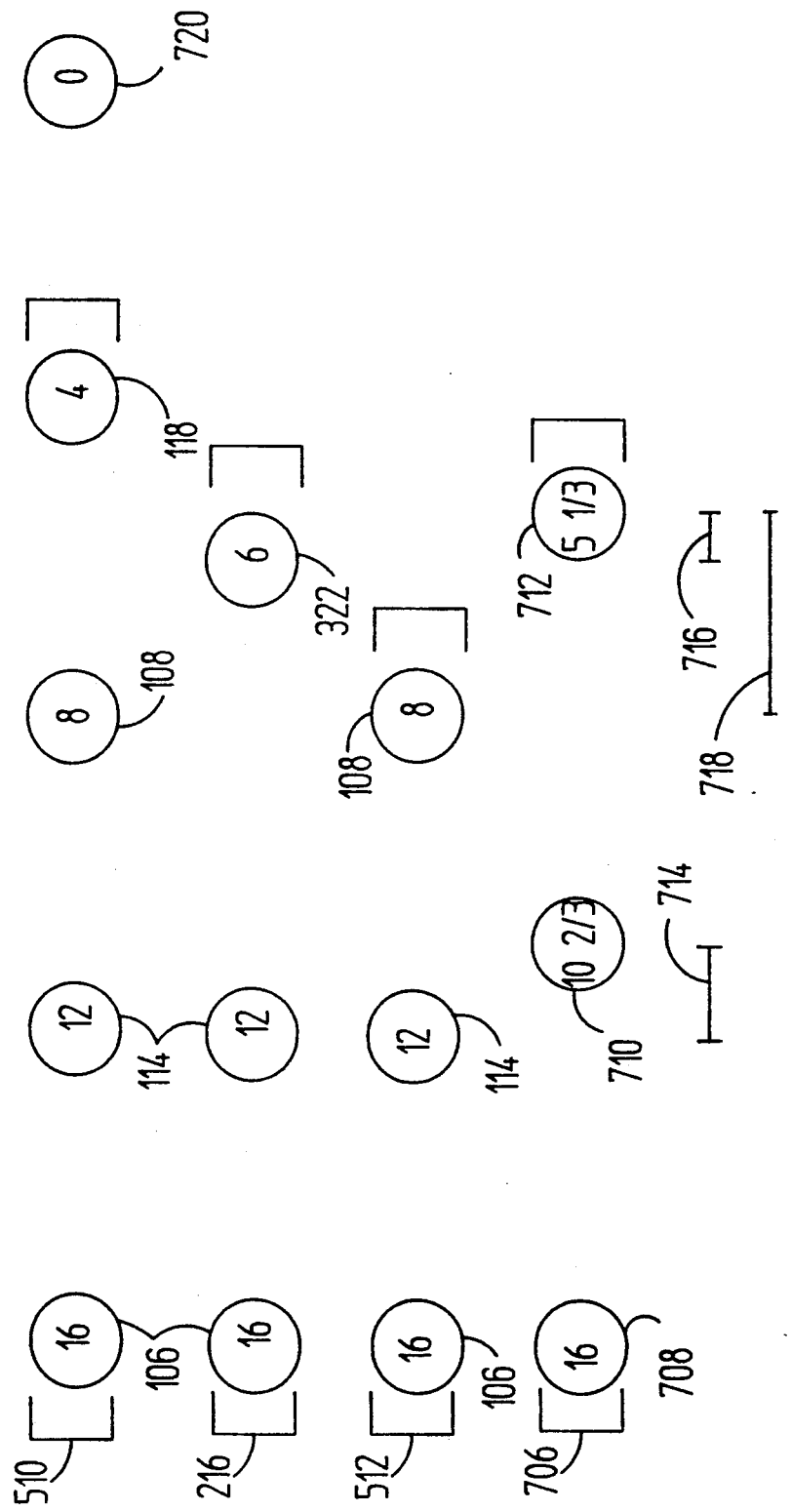
FIG. 7 shows the input row of FIG. 1, a reference pixel, the improved output row of FIG. 3, a first conventional output row of the first conventional output matrix of FIG. 5, and an ideal output row.

FIG. 7 shows a comparison of the input row 510 of FIGS. 1 and 3, the improved output row 216 of FIG. 3, the first conventional output row 512 of FIG. 1, a reference pixel 720, and an ideal output row 706. The latter represents the ideal three pixel output row generated from the four pixel input row 510. It comprises the first, second and third ideal pixels 708, 710 and 712, respectively. The reference pixel 720 shows the position and value of the pixel to the right of the input row 510.

The ideal pixels are uniformly positioned across the length of the input row 510. The position of the first ideal pixel 708 is the same as the first input pixel 106. The second ideal pixel 710 is to the right of the first ideal pixel 708 a distance of one-third the length of the input row 510. The third ideal pixel 712 is to the right of the first ideal pixel 708 a distance of two-thirds the length of the input row 510.

Because the values of the input row 510 decrease linearly, the values of the ideal pixels decrease linearly. The value of the first ideal pixel 708 is that of the first input pixel 106. The value of the second ideal pixel 710 is the value of the first ideal pixel 708 less one-third the difference between the first input pixel 106 and the reference pixel 720. Note that the value of the reference pixel 720 represents the value at the right edge of the input row 510. Thus, the value of the second ideal pixel 710 is:

$$16 - (16-0)/3 = 10\tfrac{2}{3}.$$

The value of the third ideal pixel 712 is the value of the first ideal pixel 708 less two-thirds the difference between the first input pixel 106 and the reference pixel 720. Thus, the value of the second ideal pixel 710 is:

$$16 - 2 \times (16-0)/3 = 5\tfrac{1}{3}.$$

The first input pixel 106 is the first pixel in both the improved output row 216 and the first conventional output row 512. The pixel is in the same position and has the same value as the first ideal pixel 708.

The second input pixel 114 is the second pixel in both the improved output row 216 and the first conventional output row 512. Both are to the left of the second ideal pixel 710 by the amount indicated by first positional error line 714. Both are 1⅓ greater that the second ideal pixel 710. These differences in position and value indicate the distortion produced by both the first conventional sub-sampler and the improved image processor 800.

The third pixel of the improved output row 216 is the third interpolated pixel 322. This pixel is to the left of the third ideal pixel 712 by the amount indicated by the second positional error line 16. The value of the third interpolated pixel 322 (six) is greater than the value of the third ideal pixel 712 (5⅓) by 170.

The third pixel of the conventional output row 12 is the third input pixel 108. This pixel is to the left of the third ideal pixel 712 by an amount indicated by the third positional error line 718. The value of the third input pixel 108 (eight) is greater than the value of the third ideal pixel 712 (5⅓) by 2⅔.

The difference in position between the third pixel of the improved image processor 800 and the third ideal pixel 712 (indicated by the second positional error line 716) is substantially less than the difference in position between the third pixel of the first conventional image processor and the third ideal pixel 712 (indicated by the third positional error line 718). The difference in value between the third pixel of the improved output row 216 and the third ideal pixel 712 (2/3) is substantially less than the difference between the third pixel of the conventional output row 512 and the third ideal pixel 712 (2⅔). The improved image processor 800 thus generates a more accurate output matrix than the first conventional image processor.

Furthermore, the improved image processor 800 requires far less computation time to generate an output matrix than the second conventional image processor. It would be obvious to one of skill in the art that the computation time required by the improved image processor 800 to perform one-dimensional interpolation and to perform binary rate multiplication in a parallel manner in hardware would be substantially less than that required by the second conventional image processor to perform two-dimensional convolution.

While the preferred embodiment has been set forth, various modifications may be made without departing from the spirit and scope of the present invention as defined in the appended claims.

What is claimed is:

1. An image processing method for converting a first matrix having a number of first picture elements into a second matrix having a number of second picture elements, in which the number of second picture elements differs from the number of first picture elements, comprising the steps of:
   (a) generating a third matrix having a number of third picture elements, in which the number of third picture elements is an integer multiple of the number of said second picture elements by:
      (1) partitioning said first matrix in a row by row or column by column manner into a plurality of mutually exclusive subsets, each having a different number of picture elements wherein
         (A) a first of said subsets for each row or column comprises every second picture element of said first matrix in said row or column,
         (B) a second of said subsets for each row or column comprises every fourth picture element of said first matrix in said row or column relationship, and in general,
         (C) an $i^{th}$ of said subsets comprises every $i^{(-2)nd}$ picture element of said first matrix in said row or column, and
      (2) setting a first control signal to a binary fraction which represents the ratio of the number of third picture elements to the number of first picture elements, wherein said third matrix comprises a unique combination of said subsets, wherein the number of picture elements in said unique combination equals the number of third picture elements and includes:
         (A) said first of said subsets in said unique combination if a most significant bit of said first control signal is indicated,
         (B) said second of said subsets in said unique combination if a second-most significant bit of said first control signal is indicated, and
         (C) in general, said $i^{th}$ of said subsets in said unique combination if an $i^{th}$-most significant bit of said first control signal is indicated; and
   (b) setting a second control signal to said most significant bit of said first control signal and selecting output picture elements from said third matrix which are separated from each other by a number of pixels indicated by said second control signal and using said output picture elements to generate said second matrix.

2. The image processing method defined in claim 1 wherein in step (b) said second control signal is set to one less than the ratio of the number of said third picture elements to the number of said second picture elements.

3. An image processing method for converting a first matrix having a number of first picture elements into a second matrix having a number of second picture elements, in which the number of second picture elements differs from the number of first picture elements, comprising the steps of:
   (a) performing row or column interpolation on said first picture elements to generate a fourth matrix including fourth picture elements, wherein said fourth matrix has approximately twice the number of picture elements as said first matrix in the direction of said interpolation;
   (b) generating a third matrix having a number of third picture elements, in which the number of third picture elements is an integer multiple of the number of said second picture elements by:
      (1) partitioning said fourth matrix in a row by row or column by column manner into a plurality of mutually exclusive subsets, each having a different number of picture elements wherein
         (A) a first of said subsets for each row or column comprises every second picture elements of said fourth matrix in said row or column,
         (B) a second of said subsets for each row or column comprises every fourth picture element of said fourth matrix in said row or column relationship, and in general,
         (C) an $i^{th}$ of said subsets comprises every $i^{(-2)nd}$ picture element of said fourth matrix in said row or column, and
      (2) setting a first control signal to a binary fraction which represents the ratio of the number of third picture elements to the number of first picture elements, wherein said third matrix comprises a unique combination of said subsets, wherein the number of picture elements in said unique combination equals the number of third picture elements and includes:
         (A) said first of said subsets in said unique combination if a most significant bit of said first control signal is indicated,
         (B) said second of said subsets in said unique combination if a second-most significant bit of said first control signal is indicated, and
         (C) in general, said $i^{th}$ of said subsets in said unique combination if an $i^{th}$-most significant bit of said first control signal is indicated; and
   (c) setting a second control signal to said most significant bit of said first control signal and selecting output picture elements from said third matrix which are separated from each other by a number of pixels indicated by said second control signal and using said output picture elements to generate said second matrix.

4. The image processing method defined in claim 3 wherein in step (c) said second control signal is set to one less than the ratio of the number of said third picture elements to the number of said second picture elements.

5. An image processing apparatus for converting a first matrix having a number of first picture elements into a second matrix having a number of second picture elements, in which the number of second picture elements differs from the number of first picture elements, comprising:
  (a) a first means for generating a third matrix having a number of third picture elements, in which the number of third picture elements is an integer multiple of the number of said second picture elements, said first means including:
    (1) means for partitioning said first matrix in a row by row or column by column manner into a plurality of mutually exclusive subsets, each having a different number of picture elements wherein
      (A) a first of said subsets for each row or column comprises every second picture element of said first matrix in said row or column,
      (B) a second of said subsets for each row or column comprises every fourth picture element of said first matrix in said row or column relationship, and in general,
      (C) an $i^{th}$ of said subsets comprises every $i^{(-2)nd}$ picture element of said first matrix in said row or column, and
    (2) means for setting a first control signal to a binary fraction which represents the ratio of the number of third picture elements to the number of first picture elements, wherein said third matrix comprises a unique combination of said subsets, wherein the number of picture elements in said unique combination equals the number of third picture elements and includes:
      (A) said first of said subsets in said unique combination if a most significant bit of said first control signal is indicated,
      (B) said second of said subsets in said unique combination if a second-most significant bit of said first control signal is indicated, and in general,
      (C) said $i^{th}$ of said subsets in said unique combination if an $i^{th}$-most significant bit of said first control signal is indicated; and
  (b) selecting means for setting a second control signal to said most significant bit of said first control signal and selecting output picture elements from said third matrix which are separated from each other by a number of pixels indicated by said second control signal and using said output picture elements to generate said second matrix.

6. The image processing apparatus defined in claim 5 wherein said selecting means is configured to set said second control signal to one less than the ratio of the number of said third picture elements to the number of said second picutre elements.

7. An image processing apparatus for converting a first matrix having a number of first picture elements into a second matrix having a number of second picture elements, in which the number of second picture elements differs from the number of first picture elements, comprising:
  (a) third means for performing row or column interpolation on said first picture elements to generate a fourth matrix including fourth picture elements, wherein said fourth matrix has approximately twice the number of picture elements as said first matrix in the direction of said interpolation;
  (b) a first means for generating a third matrix having a number of third picture elements, in which the number of third picture elements is an integer multiple of the number of said second picture elements, said first means including:
    (1) means for partitioning said fourth matrix in a row by row or column by column manner into a plurality of mutually exclusive subsets, each having a different number of picture elements wherein
      (A) a first of said subsets for each row or column comprises every second picture element of said fourth matrix in said row or column,
      (B) a second of said subsets for each row or column comprises every fourth picture element of said fourth matrix in said row or column relationship, and in general,
      (C) an $i^{th}$ of said subsets comprises every $i^{(-2)nd}$ picture element of said fourth matrix in said row or column, and
    (2) means for setting a first control signal to a binary fraction which represents the ratio of the number of third picture elements to the number of first picture elements, wherein said third matrix comprises a unique combination of said subsets, wherein the number of picture elements in said unique combination equals the number of third picture elements and includes:
      (A) said first of said subsets in said unique combination if a most significant bit of said first control signal is indicated,
      (B) said second of said subsets in said unique combination if a second-most significant bit of said first control signal is indicated, and in general,
      (C) said $i^{th}$ of said subsets in said unique combination if an $i^{th}$-most significant bit of said first control signal is indicated; and
  (c) selecting means for setting a second control signal to said most significant bit of said first control signal and selecting output picture elements from said third matrix which are separated from each other by a number of pixels indicated by said second control signal and using said output picture elements to generate said second matrix.

8. The image processing apparatus defined in claim 7 wherein said selecting means is configured to set said second control signal to one less than the ratio of the number of said third picture elements to the number of said second picture elements.

9. An image processing method for generating an output matrix having output pixels and a desired resolution from an input matrix having input pixels and an input resolution, comprising the steps of:
  (a) interpolating the input matrix to generate a high resolution matrix having high resolution pixels;
  (b) performing binary rate multiplication on said high resolution matrix to generate an intermediate resolution matrix having intermediate resolution pixels; and
  (c) selecting ones of said intermediate pixels which have a determinable number of said intermediate resolution pixels between them to generate the output matrix.

10. The method of claim 9, wherein step (a) comprises the steps of:
  (i) calculating the average of values associated with a first and second of the input pixels, said first and second input pixels being adjacent in the input matrix; and
  (ii) associating said calculated average with an interpolated pixel, said interpolated pixel being adjacent to said first input pixel and said second input pixel in said high resolution matrix.

11. The method of claim 9, wherein step (b) comprises the steps of:
   (i) partitioning said high resolution pixels in a row by row or column by column manner into a plurality of mutually exclusive subsets, each having a different number of pixels;
   (ii) selecting as said intermediate resolution pixels each of said high resolution pixels in ones of said subsets until the number of high resolution pixels selected is an integer multiple of the desired resolution.

12. The method of claim 9, wherein step (c) comprises the steps of:
   (i) dividing a resolution of said intermediate resolution matrix by the desired resolution; and
   (ii) subtracting one from a quotient calculated in step (c)(i) to calculate said determinable number of intermediate resolution pixels.

13. The method of claim 9, wherein step (a) comprises the steps of:
   (i) dividing the resolution of the input matrix by the resolution of the output matrix; and
   (ii) suppressing said interpolation if a quotient determined in step (a)(i) is at least two.

14. An image apparatus for receiving an input matrix having input pixels and an input resolution and transmitting an output matrix having output resolution pixels and a desired resolution, comprising:
   (a) interpolation means for receiving and interpolating the input matrix, and alternately transmitting one of the input pixels and one interpolated pixel as high resolution pixels of a high resolution matrix;
   (b) binary rate multiplication means for receiving and performing binary rate multiplication on said high resolution matrix, and transmitting a subset of said high resolution pixels thereby generated as an intermediate resolution matrix having intermediate resolution pixels and having a resolution which is an integer multiple of the desired resolution; and
   (c) pixel selection means for receiving said intermediate resolution matrix, selecting ones of said intermediate pixels which have a determinable number of said intermediate pixels between them, and transmitting said selected intermediate resolution pixels as the output matrix.

15. The apparatus of claim 14, wherein said interpolation means comprises:
   (a) means for calculating an average of values associated with a first and second of the input pixels, said first and second input pixels being adjacent in the input matrix;
   (b) means for associating said calculating average with an interpolated pixel; and
   (c) means for sequentially transmitting said first input pixel, said interpolated pixel and said second input pixel as said high resolution pixels.

16. The apparatus of claim 14, further comprising resolution comparing means comprising:
   (a) means for setting a first control signal to a binary fraction which represents the approximate ratio of the intermediate resolution to twice the input resolution; and
   (b) means for transmitting said first control signal to said binary rate multiplication means.

17. The apparatus of claim 16, wherein said binary rate multiplication means further includes means for receiving said first control signal and said intermediate resolution matrix generated by said binary rate multiplication means includes:
   (a) said first of said subsets in said unique combination if a most significant bit of said first control signal is indicated;
   (b) said second of said subsets in said unique combination if a second-most significant bit of said first control signal is indicated; and
   (c) in general, said $i^{th}$ of said subsets in said unique combination if an $i^{th}$-most significant bit of said first control signal is indicated.

18. The apparatus of claim 14, further comprising resolution comparing means comprising:
   (a) means for setting a first control signal to a binary fraction which represents the approximate ratio of the desired resolution to twice the input resolution; and
   (b) means for transmitting said first control signal to said binary rate multiplication means.

19. The apparatus of claim 14, further comprising resolution comparing means comprising:
   (a) means for generating a second control signal by subtracting 1 from a ratio of a resolution of said intermediate resolution matrix to the desired resolution; and
   (b) means for transmitting said second control signal to said pixel selection means to indicate said determinable number of said intermediate pixels.

* * * * *